Aug. 16, 1966  B. SPIEKER ET AL  3,267,399

SIGNAL GENERATOR

Filed July 29, 1964

INVENTORS
BERNARD SPIEKER
THOMAS J. LAVIN

BY *Herbert L. Davis*
ATTORNEY

United States Patent Office 3,267,399
Patented August 16, 1966

3,267,399
SIGNAL GENERATOR
Bernard Spieker, New Milford, and Thomas J. Lavin, Midland Park, N.J., assignors to The Bendix Corporation, Teterboro, N.J., a corporation of Delaware
Filed July 29, 1964, Ser. No. 385,891
7 Claims. (Cl. 336—110)

This invention relates to a signal generator and more particularly to a novel means for sensing the rotation of an output shaft of a stepper motor, and which sensing means may be detachably mounted in relation to an output shaft of the motor and include at least two sensing devices together with additional novel means for adjusting at least one of the sensing devices angularly relative to the shaft and to at least one of the other of the sensing devices.

Heretofore, stepper motors have been widely used in digital systems as an output device, and where the load must be positioned through more than one step, the step input circuitry must receive an electrical feedback or rate signal from the motor so that each succeeding step is properly timed as the motor accelerates. Such motors have been wound with internal sense windings to provide the feed-back signal and are larger in size than motors without such windings, since the shaft position sensing stator and rotor are often of equal size with the drive stator and rotor of the motor. Also, in such prior devices, the position of the sense windings cannot be changed in relation to the angular position of the motor shaft or if two sense windings occupy the same stator, the angular position of one cannot be angularly adjusted with respect to the other.

An object of the present invention is to provide a signal or rate generator which may be applied externally to the drive shaft of the motor without substantially increasing the length or size of the motor.

Another object of the invention is to provide a removable signal or rate generator having a first shaft sensing coil which may be angularly positioned with respect to a motor shaft, together with an adjustably positioned sensing coil that may be angularly positioned with respect to the first shaft sensing coil and the angular position of the motor shaft.

Another object of the invention is to provide a signal generator including a pair of electromagnetic windings arranged in cooperative relation with a toothed rotor mounted in a circular opening between the two electromagnetic windings and driven by the motor shaft so that as the rotor is rotated relative to the magnetic poles of the windings, the rotation of the toothed rotor may cause a predetermined pattern of variations in the magnetic flux to thereby induce in the windings electrical signals which correspond to the angular position of the motor shaft, and including novel adjustable means for angularly positioning the electromagnetic windings relative one to the other and to the angular position of the motor shaft for setting the effect of the aforesaid signals and to provide a phase shift in the electrical output signals as may be desired.

Another object of the invention is to provide a signal generator including a pair of magnetic flux sensing windings, each having a magnetically permeable member arranged in cooperative relation with a rotor having toothed portions permanently magnetized so as to alternately provide opposite magnetic poles, said rotor being mounted in a circular opening between the magnetically permeable members of the magnetic flux sensing windings and driven by the motor shaft so that as the rotor is rotated to alternately position the opposite magnetic poles of the toothed portions of the rotor relative to the magnetically permeable members of the windings, the rotation of the toothed rotor may cause a predetermined pattern of variation in the magnetic flux to thereby induce in the windings electrical signals which correspond to the angular position of the motor shaft, and including novel adjustable means for angularly positioning the magnetically permeable members of the magnetic flux sensing windings relative one to the other and to the angular position of the motor shaft for setting the effect of the aforesaid signals and to provide a phase shift in the electrical output signals as may be desired.

These and other objects and features of the invention are pointed out in the following description in terms of the embodiments thereof which are shown in the accompanying drawings. It is to be understood, however, that the drawings are for the purpose of illustration only and are not a definition of the limits of the invention. Reference is to be had to the appended claims for this purpose.

Figure 1:
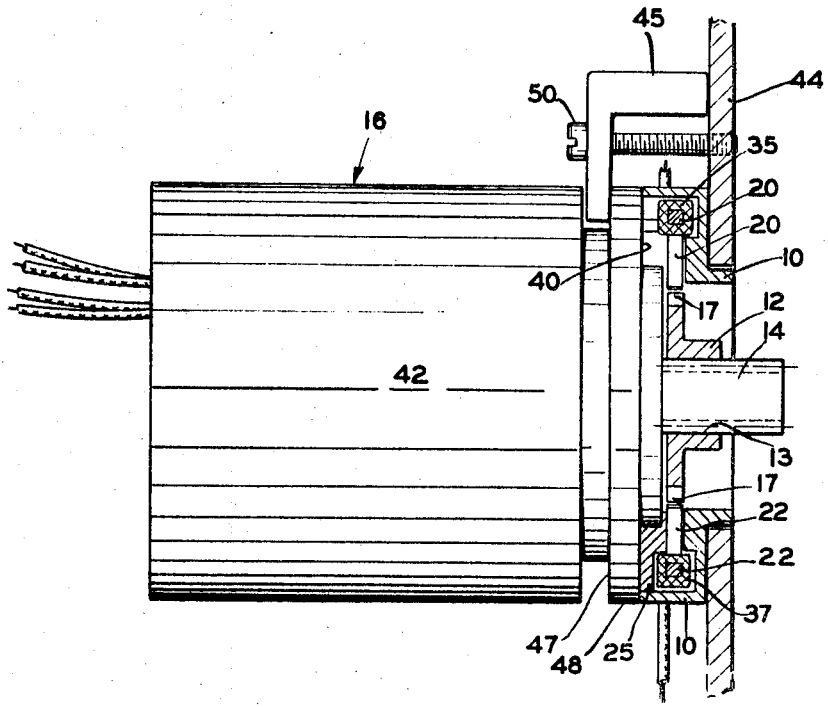
FIGURE 1 is an assembled view of a stepper motor with a signal generator device embodying the invention shown in section and in assembled relation with the stepper motor.
Figure 2:
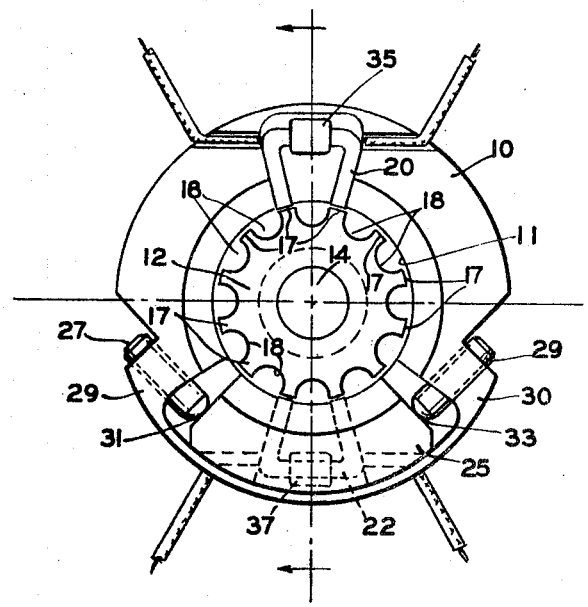
FIGURE 2 is an end view of the signal generator device with the upper half of the device broken away to show one of the electromagnetic coils therein.

Referring to the drawing of FIGURE 2, the signal or rate generator is shown including an annular body portion 10 having a circular opening 11 in which is rotatably mounted a toothed rotor 12 which may be spline connected at 13 by a press fit to a drive shaft 14 of a stepper motor 16, as shown in FIGURE 1. The rotor 12 is formed of a suitable ferro-magnetic material and includes in the periphery thereof toothed portions 17 and indent portions 18 therebetween. The rotor 12 is arranged in cooperative relation between opposite poles of semicircular horse-shoe shaped members 20 and 22 formed of a suitable magnetically permeable or ferro-magnetic material. The members 20 and 22 each have a pair of leg portions which may form opposite magnetic poles at the free ends thereof. The member 20 is secured in the annular body portion 10, as shown in FIGURES 1 and 2, while the member 22 is carried by a segmental portion 25, which, as shown in FIGURES 1 and 2, may be arcuately adjustable in the body portion 10 by the adjustment of suitable members or bolts 27 and 29 extending in screw threaded engagement through flange portions 28 and 30 of the body portion 10 into operative engagement with opposite end surfaces 31 and 33 of the segmental portion 25.

As shown in FIGURES 1 and 2, there are wound about the horse-shoe shaped members 20 and 22 and intermediate the opposite leg portions thereof electromagnetic coils 35 and 37, each of which may include in a conventional manner an exciting winding and a flux sensing or signal winding. Either an A.C. voltage or a D.C. voltage may be applied to the exciting windings of coils 35 and 37 through suitable conventional circuitry, not shown, so that as the rotor 12 spline connected to the shaft 14 of the stepper motor 16 is rotated under the poles at the ends of the leg portions of the members 20 and 22, the resulting variations in the magnetic flux passing through the members 20 and 22 will induce in the flux sensing windings of the coils 35 and 37 useful electric signals which correspond to the angular position of the motor shaft 14.

Further, as shown in FIGURE 2, the lower member 22 may be positioned angularly with respect to the toothed portions 17 of the rotor 12 and to the other member 20 by the adjustment of the screws 27 and 29 so as to provide a phase shift between the two output signals from the flux sensing windings of the coils 35 and 37 for purposes well known in the art.

Thus, through the action of the magnetic circuit arrangement upon a D.C. voltage being applied to the exciting windings of the coils 35 and 37, electrical pulses of variable frequency will be induced in the flux sensing windings of the coils 35 and 37 in synchronism with the angular speed of the stepper motor 16 while upon an A.C. voltage being applied to the exciting windings of the coils 35 and 37, electrical pulses of a frequency corresponding to that of the applied A.C. voltage, but of an amplitude proportional to the angular speed of the rotor 12, will be induced in the flux sensing windings of the coils 35 and 37.

Flux variations may be caused to occur by changing the air gap in the magnetic circuit through the arcuate adjustment of the segmental member 25.

A quiescent flux level may be established by using permanently magnetized materials in the members 20 and 22 or by supplying a constant M.M.F. to an exciting winding in the coils 35 and 37 by means of an external source of electrical energy.

In one form of the invention, the members 20 and 22 may be of a magnetically permeable material magnetized by exciting windings in the coils 35 and 37, respectively; in a second form of the invention, the members 20 and 22 may be permanent magnets, while in a third form of the invention the members 20 and 22 may be of a magnetically permeable material and the teeth 17 of the rotor 12 may be permanently magnetized so as to alternately provide opposite, north and south, magnetic poles cooperatively arranged in relation to the ends of the leg portions of the members 20 and 22. In such arrangements, variations in the magnetic flux passing through the magnetically permeable members 20 and 22 resulting from angular movement of the toothed rotor 12 relative to the members 20 and 22 is effective to induce electrical output signals in the flux sensing windings of the coils 35 and 37. Also, variations in the magnetic flux pattern may be effected by changing the angular relation of the members 20 and 22 relative one to the other and to the toothed rotor 12 by suitable arcuate adjustment of the segmental member 25.

Induced output pulses then in the flux sensing windings of the electromagnetic coils 35 and 37 of the three forms of the invention will occur at specific angular positions of the rotor 12 and the characteristics of these output pulses, as heretofore explained, will be dependent upon the angular speed of the motor shaft 14. Such pulses may thereby serve as a source of incremental position or velocity data.

In an initial assembly of the signal or rate generator to a desired predetermined operative relation to the stepper motor 16, the body portion 10 of the signal generator is positioned between an end wall 40 of a housing 42 of the motor 16 and a mounting plate 44. In such assembly the leg portions of the member 20 mounted in the body portion 10 are first portioned to a desired predetermined angular relation to the toothed portions of the rotor 12 which, as heretofore explained, has been press fitted to the drive shaft 14 at the spline connection 13.

The body portion 10 of the signal generator and the housing 42 of the motor 16 are then secured in such predetermined angular relation by three equally angularly spaced clamping members, one of which has been indicated in FIGURE 1 by the numeral 45. Each of the clamping members 45 are arranged to engage in channel 47 provided in an annular flange 48 projecting from the end wall 40 of the housing 42 of the motor 16.

Each of the clamping members 45 have a fastening bolt 50 screw threadedly engaged in the mounting plate 44 so that the clamping members 45 may be each tightly drawn into engaging relation with the flange 48 so as to clamp the body portion 10 of the signal generator between the end wall 40 of the motor housing 42 and the mounting plate 44 to fix the leg portions of the member 20 in the desired predetermined angular relation to the toothed portions 17 of the rotor which has been press fitted at the spline connection 13 to the drive shaft 14 of the stepper motor 16.

Thereafter the leg portions of the second member 22 carried by the segmental portion 25 may be angularly positioned with extreme accuracy to a desired predetermined relation to the motor shaft 14 and the toothed portions 17 of the rotor 12 by the arcuate positioning of the segmental portion 25 by a fine adjustment of the setting bolts 27 and 29, as heretofore explained.

While several embodiments of the invention have been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A signal generator for use with a motor having an output shaft, said signal generator comprising a rotor of a ferro-magnetic material having a series of toothed portions, means for drivingly connecting the rotor to said output shaft, a body portion having a circular opening in which said rotor may be angularly positioned, an electromagnetic means including a first member mounted in said body portion in cooperative relation to said rotor, a segmental portion carried by said body portion, said electromagnetic means including a second member mounted in said segmental portion in cooperative relation to said rotor, and means to arcuately position the segmental portion in relation to said body portion to vary the angular position of the first and second members of said electromagnetic means in relation one to the other and the angular position of the second member of said electromagnetic means relative to said toothed rotor.

2. The combination defined by claim 1 in which the first member of said electromagnetic means includes a first permanent magnet having a pair of opposite leg portions, said second member of the electromagnetic means includes a second permanent magnet having a pair of opposite leg portions, the opposite leg portions of each of said magnets providing opposite magnetic poles at the ends thereof, the magnetic poles at the ends of the opposite leg portions of each of said magnets cooperating with the toothed portions of said rotor in such a manner that upon angular movement of the rotor relative thereto, there is effected a predetermined pattern of magnetic flux variations in magnetic paths between the toothed portions of the rotor and the opposite poles at the ends of the leg portions of said magnets.

3. The combination defined by claim 1 in which the first member of said electromagnetic means includes a first part of a magnetically permeable material, said first part having a pair of opposite leg portions, said second member of said electromagnetic means includes a second part of a magnetically permeable material, said second part having a pair of opposite leg portions, the opposite leg portions of each of said parts providing opposite magnetic poles at the ends thereof, the magnetic poles at the opposite ends of the leg portions of each of said parts cooperating with the toothed portions of said rotor in such a manner that upon angular movement of the motor relative thereto, there is effected a predetermined pattern of magnetic flux variations in magnetic paths between the toothed portions of the rotor and the opposite poles at the ends of the leg portions of said first and second parts.

4. The combination defined by claim 1 in which the first member of said electromagnetic means includes a first part of a magnetically permeable material, said first part having a pair of opposite leg portions, said second member of the electromechanical means includes a second part of a magnetically permeable material, said second part having a pair of opposite leg portions, the rotor having toothed portions permanently magnetized so as to alternatively provide opposite magnetic poles cooperatively arranged in relation to ends of the opposite leg portions of each of said first and second parts in such a manner that upon angular movement of the rotor relative to said first and second parts, there is effected a predetermined pattern of magnetic flux variations in magnetic paths between the permanently magnetized toothed portions of the rotor and the opposite ends of the leg portions of said first and second parts.

5. The combination defined by claim 1 in which the means to arcuately position the segmental portion in relation to said body portion includes a pair of adjustable members carried by the body portion and engaging the segmental portion at opposite ends thereof to arcuately position the segmental portion in relation to said body portion to vary the position of the second member of said electromagnetic means relative to the first member of said electromagnetic means and angularly relative to said toothed portions of the rotor.

6. A signal generator for use with a stepper motor having an output shaft, said signal generator comprising a rotor of a ferro-magnetic material having a series of peripheral toothed portions, an engageable means for drivingly connecting the rotor to the output shaft of said motor, a body portion having a circular opening in which said rotor may be rotatably positioned, a first magnet mounted in said body portion, said first magnet having a pair of opposite leg portions positioned in cooperative relation to the toothed portions of said rotor, a first electromagnetic coil mounted intermediate the opposite leg portions of said first magnet, an arcuately adjustable member slidably mounted in said body portion, a second magnet mounted in said adjustable member, said second magnet having a pair of opposite leg portions positioned in cooperative relation to toothed portions of said rotor, a second electromagnetic coil mounted intermediate the opposite leg portions of said second magnet, the opposite leg portions of each of said magnets providing opposite magnetic poles at the ends thereof, the magnetic poles at the ends of the opposite leg portions of each of said magnets cooperating with the toothed portions of said rotor in such a manner that upon angular movement of the toothed portions of the rotor relative thereto, there is effected a predetermined pattern of variations in magnetic paths effected between the toothed portions of the rotor and the opposite magnetic poles at the ends of the leg portions of said magnets, said first and second electromagnetic coils each including a magnetic flux sensing winding, said variations in said magnetic paths causing a change in magnetic flux acting on said windings resulting in electrical signals being induced in the magnetic flux sensing windings of said electromagnetic coils, a pair of adjustable bolts extending in screw threaded engagement through said body portion into operative engagement with opposite end surfaces of the arcuately adjustable member, said adjustable bolts being operative to slidably position the arcuately adjustable member in said body portion so as to angularly position the magnetic poles at the ends of the opposite leg portions of the second magnet relative to the toothed portion of the rotor and relative to the magnetic poles at the ends of the opposite leg portions of the first magnet so as to thereby set the predetermined pattern of variations in the magnetic paths effected upon the afforesaid angular movement being imparted to said toothed portions of the rotor.

7. A signal generator for use with a stepper motor having an output shaft, said signal generator comprising a rotor of a ferro-magnetic material having a series of peripheral toothed portions permanently magnetized so as to alternately provide opposite magnetic poles, an engageable means for drivingly connecting the rotor to the output shaft of said motor, a body portion having a circular opening in which said rotor may be rotatably positioned, a first member of a magnetically permeable material mounted in said body portion, said first member having a pair of opposite leg portions positioned in cooperative relation to the permanently magnetized toothed portions of said rotor, a first magnetic flux sensing coil mounted intermediate the opposite leg portions of said first member, an arcuately adjustable member slidably mounted in said body portion, a second member of a magnetically permeable material mounted in said adjustable member, said second member having a pair of opposite leg portions positioned in cooperative relation to the permanently magnetized toothed portions of said rotor, a second magnetic flux sensing coil mounted intermediate the opposite leg portions of said second member, the opposite permanently magnetized toothed portions of said rotor cooperating with the opposite ends of the leg portions of each of said members in such a manner that upon angular movement of the toothed portions of the rotor relative thereto, there is effected a predetermined pattern of variations in magnetic paths effected between the toothed portions of said rotor and opposite ends of the leg portions of said members, and variations in said magnetic paths causing a change in magnetic flux acting on said sensing coils resulting in an electrical signal being induced in said sensing coils, a pair of adjustable bolts extending in screw threaded engagement through said body portion into operative engagement with opposite end surfaces of the arcuately adjustable member, said adjustable bolts being operative to slidably position the arcuately adjustable member in said body portion so as to angularly position the opposite ends of the leg portions of said second member relative to the permanently magnetized toothed portions of said rotor and relative to the opposite ends of the leg portions of said first member so as to thereby set the predetermined path of variations in the magnetic paths effected upon the aforesaid angular movement being imparted to the toothed portions of said rotor.

No references cited.

LARAMIE E. ASKIN, *Primary Examiner.*